(12) United States Patent
Xiaopu et al.

(10) Patent No.: US 11,405,351 B2
(45) Date of Patent: Aug. 2, 2022

(54) SOURCE-AWARE TECHNIQUE FOR FACILITATING LISP HOST MOBILITY

(71) Applicant: Cisco Technology, Inc., San Jose, CA (US)

(72) Inventors: Zhang Xiaopu, Shanghai (CN); Li Yan, Shanghai (CN); Marco Pessi, Mountain View, CA (US); Wei Ling, San Jose, CA (US); Michael David Tracy, Foster City, CA (US); Chen Zhang, San Jose, CA (US); Darrel Jay Lewis, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/403,564

(22) Filed: Aug. 16, 2021

(65) Prior Publication Data
US 2021/0377208 A1 Dec. 2, 2021

Related U.S. Application Data

(63) Continuation of application No. 15/872,545, filed on Jan. 16, 2018, now Pat. No. 11,115,374, which is a (Continued)

(51) Int. Cl.
*H04L 45/74* (2022.01)
*H04L 61/103* (2022.01)
(Continued)

(52) U.S. Cl.
CPC ............ *H04L 61/103* (2013.01); *H04L 45/02* (2013.01); *H04L 45/74* (2013.01); *H04L 61/2084* (2013.01); *G06F 15/17* (2013.01)

(58) Field of Classification Search
None
See application file for complete search history.

(56) References Cited

U.S. PATENT DOCUMENTS 7,093,283 B1 * 8/2006 Chen ...................... H04L 63/20
709/242
8,843,588 B2 * 9/2014 Flinck ................... G06F 9/5016
709/217

(Continued)

OTHER PUBLICATIONS

Farinacci, D., "Locator/ID Separation Protocol (LISP)," Network Working Group Internet Draft draftietf-lisp-20; Jan. 22, 2012, 96 pages.

(Continued)

*Primary Examiner* — James A Edwards
(74) *Attorney, Agent, or Firm* — Polsinelli PC

(57) ABSTRACT

A method is provided in one example embodiment and includes detecting by a first network element at a first data center site a local connection of an endpoint identifier ("EID"), in which the EID was previously locally connected to a second network element at a second data center site and notifying a mapping server of the local connection of the EID to the first network element. The method further includes receiving from the mapping server identifying information for the second network element and communicating with the second network element using the identifying information to obtain service information for traffic associated with the EID. The method may also include applying a service identified by the service information to outgoing traffic from the EID as well as applying a service identified by the service information to incoming traffic for the EID.

20 Claims, 10 Drawing Sheets

Related U.S. Application Data continuation of application No. 14/470,665, filed on Aug. 27, 2014, now Pat. No. 9,894,031.

(51) Int. Cl.
*H04L 45/02* (2022.01)
*H04L 61/5084* (2022.01)
*G06F 15/17* (2006.01)

(56) References Cited

U.S. PATENT DOCUMENTS

| | | | |
|---|---|---|---|
| 2003/0117993 A1* | 6/2003 | Syvanne | H04L 63/02 370/349 |
| 2006/0123425 A1 | 6/2006 | Ramarao | |
| 2008/0155647 A1 | 6/2008 | Miyawaki | |
| 2009/0241170 A1 | 9/2009 | Kumar | |
| 2009/0276771 A1 | 11/2009 | Nickolov | |
| 2010/0071050 A1 | 3/2010 | Wing | |
| 2010/0157964 A1 | 6/2010 | Yoon | |
| 2011/0035494 A1 | 2/2011 | Pandey et al. | |
| 2012/0173694 A1 | 7/2012 | Yan | |
| 2012/0176936 A1* | 7/2012 | Wu | H04W 8/26 370/254 |
| 2012/0180114 A1 | 7/2012 | Huang | |
| 2012/0180117 A1 | 7/2012 | Sun | |
| 2012/0180122 A1 | 7/2012 | Yan | |
| 2012/0198025 A1 | 8/2012 | Wang | |
| 2012/0226801 A1 | 9/2012 | Velaga | |
| 2012/0320876 A1 | 12/2012 | Zhou | |
| 2013/0024553 A1 | 1/2013 | Mittal et al. | |
| 2013/0103819 A1* | 4/2013 | Meyer | H04L 61/103 709/223 |
| 2013/0177019 A1 | 7/2013 | Zhang | |
| 2013/0182708 A1 | 7/2013 | Sharma et al. | |
| 2013/0198369 A1 | 8/2013 | Kim | |
| 2014/0016635 A1 | 1/2014 | Kano | |
| 2014/0101656 A1 | 4/2014 | Zhu et al. | |
| 2014/0366119 A1 | 12/2014 | Floyd | |
| 2015/0131664 A1 | 5/2015 | Page | |
| 2015/0156183 A1 | 6/2015 | Beyer | |
| 2015/0195178 A1 | 7/2015 | Bhattacharya et al. | |
| 2015/0358291 A1 | 12/2015 | Halabi | |

OTHER PUBLICATIONS

Farinacci, D., "The Locator/ID Separation Protocol (LISP)," Internet Engineering Task Force (IETF), RFC 6830, Jan. 2013, 76 pages.

* cited by examiner

SOURCE-AWARE TECHNIQUE FOR FACILITATING LISP HOST MOBILITY

CROSS-REFERENCE TO RELATED APPLICATIONS

This application is a continuation of U.S. Non-Provisional patent application Ser. No. 15/872,545, filed Jan. 16, 2018, which is a continuation of U.S. Non-Provisional patent application Ser. No. 14/470,665, filed Aug. 27, 2014, now U.S. Pat. No. 9,894,031, the full disclosures of which are incorporated herein by reference in their entireties.

TECHNICAL FIELD

This disclosure relates in general to data communications networks and, more particularly, to a source-aware technique for facilitating Location Identity Separation Protocol ("LISP") host mobility in such networks.

BACKGROUND

The traditional IP addressing model associates both an identity and a location of a device to a single IP address space. This results in mobility being a very cumbersome process, as identity and location are so tightly bundled. LISP is a routing architecture in which an identifier of a device, referred to as its Endpoint Identifier ("EID"), and its location, identified by its Routing Locator ("RLOC"), are split into two different name spaces. LISP also provides a dynamic mapping mechanism between the two address families. RLOCs remain associated with the topology and are reachable via traditional routing; however EIDs can change location dynamically and are reachable via different RLOCs, depending on where an EID attaches to the network. In a virtualized data center deployment, EIDs can be directly assigned to virtual machines ("VMs") that are free to migrate between data center sites while preserving their IP addressing information.

LISP uses a dynamic tunneling encapsulation approach, rather than requiring the pre-configuration of tunnel endpoints. As previously noted, LISP name spaces include EID addresses, which include the IP address and previses identifying the endpoints, and RLOC addresses, which include the IP addresses and previses identifying the different routers in the network. EID reachability across LISP sites is achieved by resolving EID-to-RLOC mapping, while RLOC reachability is achieved by traditional routing methods. LISP sites may also include LISP site devices such as an Ingress Tunnel Router ("ITR") and an Egress Tunnel Router ("ETR"). An ITR may comprise a LISP site edge device that receives packets from site-facing interfaces, or internal hosts, encapsulates the packets, and forwards them to remote LISP sites. The ITR may alternatively natively forward the packets to non-LISP sites. An ETR may comprise a LISP site edge device that receives packets from core-facing interfaces, or the transport infrastructure, decapsulates LISP packets, and delivers them to local EIDs at the site.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
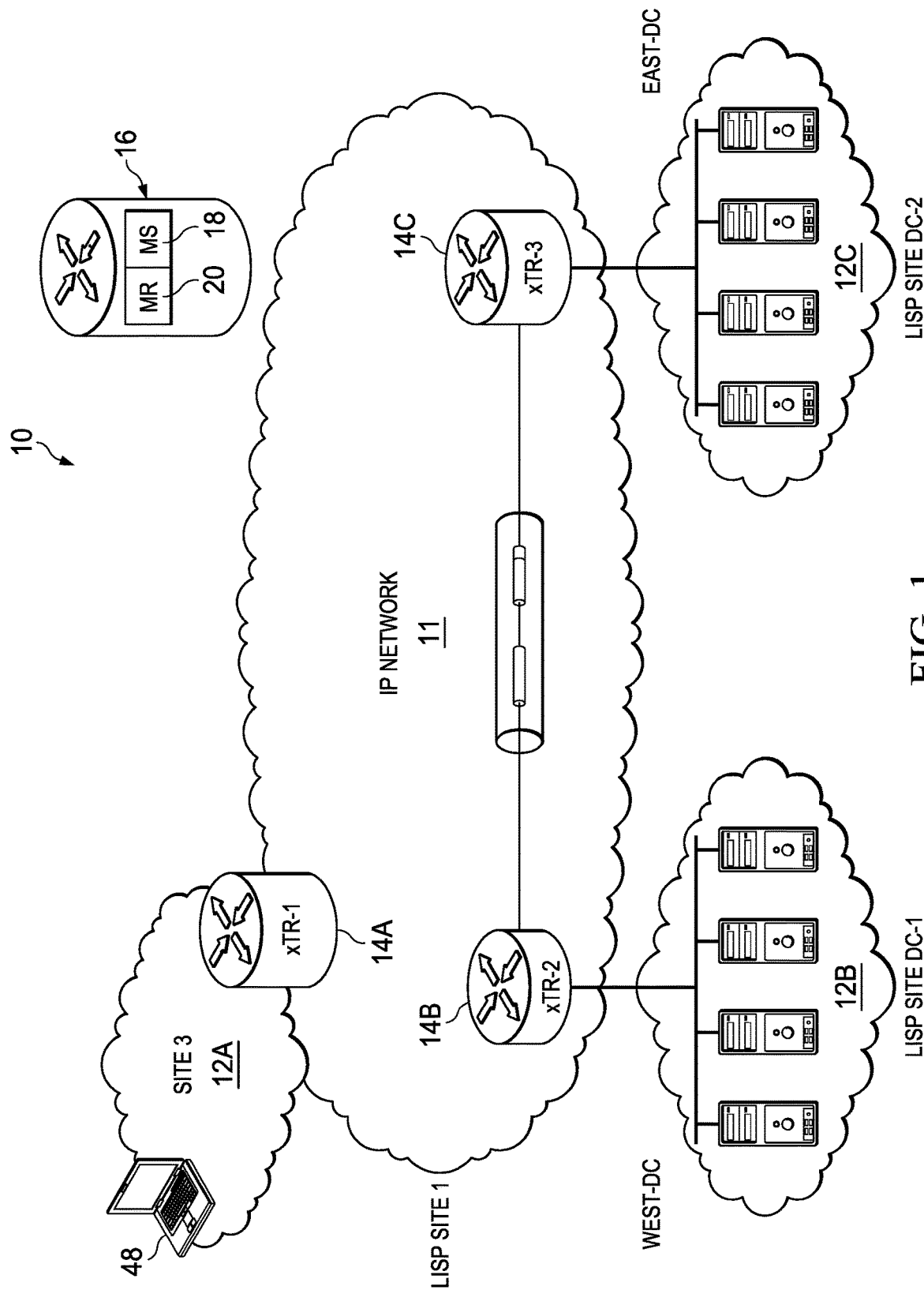
FIG. 1 is a simplified block diagram comprising features of one embodiment for providing host mobility in a LISP-enabled IP network.

A method is provided in one example embodiment and includes detecting by a first network element at a first data center site a local connection of an endpoint identifier ("EID"), in which the EID was previously locally connected to a second network element at a second data center site and notifying a mapping server of the local connection of the EID to the first network element. The method further includes receiving from the mapping server identifying information for the second network element and communicating with the second network element using the identifying information to obtain service information for traffic associated with the EID. The method may also include applying a service identified by the service information to outgoing traffic from the EID as well as applying a service identified by the service information to incoming traffic for the EID. In certain embodiments, each of the first and second data center sites may be a Location Identity Separation Protocol ("LISP")-enabled site. In some embodiments, each of the first and second network elements may include an ingress/egress tunnel router ("xTR").

A service identified by the service information may include a firewall, in which case the method may further include establishing a communications channel between a firewall at the first data center site and a firewall at the second data center site; and initiating a state transfer from the firewall at the second data center site to the firewall at the first data center site. In some instances, the method may also include providing a filter to the firewall at the second data center site so that only states related to the EID are transferred to the firewall at the first data center site. The state transfer may be one of a signal-based event-driven bulk state transfer ("EDBST") and a traffic-based event-driven state transfer ("EDST"). A service identified by the service information may also include Network Based Application Recognition ("NBAR"), in which case the method may further include, subsequent to the detecting, sending a query to an NBAR controller to determine an action to be performed in connection with the traffic associated with the EID, in which the query includes a tuple identifying with the traffic associated with the EID, the tuple being used to index an entry of a flow table maintained by the NBAR controller, the indexed flow table entry indicating the action to be performed; receiving from the NBAR a query response comprising an indication of the action to be performed in connection with the traffic associated with the EID; and applying the indicated action.

Example Embodiments

The increasing use of virtualization in the data center has enabled an unprecedented degree of flexibility in managing servers and workloads. A key to leveraging this flexibility is mobility; workloads hosted on virtual servers are decoupled from the physical infrastructure and become mobile by definition. As a result, the routing infrastructure is challenged to evolve from a topology-centric addressing model to a more flexible architecture that permits IP addresses to freely and efficiently move across the infrastructure. There are several ways of adding mobility to an IP infrastructure, each of which addresses the problem with different degrees of effectiveness. LISP host mobility is one such solution. Various details regarding LISP implementation can be found in Internet Engineering Task Force Request for Comments 6830 entitled "Locator/ID Separation Protocol (LISP)" ("IETF RFC 6830"), which is hereby incorporated by reference in its entirety.

It will be recognized that there are certain fundamental aspects that must be addressed in an IP mobility solution, such as LISP host mobility. These include redirection, scalability, routing optimization, client independence, and address family agnosticism. With regard to redirection, a primary goal of IP mobility is to direct traffic to the actual location of the specified end point. This goal is typically addressed by providing a redirection mechanism to enhance traffic steering already provided by the basic routing mechanism. This may be accomplished through replacing the destination's address or by leveraging a level of indirection in addressing such as may be achieved with tunnels and encapsulation. Ultimately, IP mobility should provide a solution that is totally transparent to the applications and allows for the preservation of established sessions, as endpoints move around the IP infrastructure. As for scalability, most IP mobility techniques create a significant amount of granular state to effectively redirect traffic, which granular state is necessary to correlate destination IP addresses to specific locations, either through mapping or translation. This increase in state must be handled efficiently to attain a solution that can support a deployable scale at a cost, in terms of memory and processing, that is not unreasonable.

With regard to routing optimization, as endpoints roam, traffic must still be routed to the endpoints via the best possible path. The ability to optimize the path is largely a function of the location of the redirecting element. A mobility solution must provide optimized paths regardless of the location of the endpoint. It is also important that the mobility solution not depend on agents installed on the endpoints or the clients communicating with the endpoints. The solution should therefore be network-based, given the large installed base of endpoints that presumably cannot be changed or managed at will to install client software. In the context of address family agnosticism, the IP mobility solution should work independently of IPv4 or IPv6 endpoints and network. Since mobility relies on manipulating the mapping of identity to location, address families with longer addresses tend to offer alternatives not available with shorter addresses. Address-dependent solutions have limited application because they generally require an end-to-end deployment of IPv6; the ideal solution should work for either IPv4 or IPv6.

As previously noted, the traditional IP addressing model associates both location and identity to a single IP address space, which makes mobility cumbersome. By providing two separate address spaces for location and identity, LISP provides a dynamic mapping mechanism. RLOCs remain associated with the topology and are reachable by traditional routing; however, EIDs can change location dynamically and are reachable via different RLOCs depending on where the EID attaches to the network. In a virtualized data center deployment, for example, EIDs can be assigned to virtual machines ("VMs") that are free to migrate between sites while preserving their IP addressing information. In this manner, LISP host mobility allows the EID space to be mobile without affecting the routing that interconnects the RLOC space. When a move from one LISP-enabled site to another is detected, as described below, EID-to-RLOC mappings are updated by the Ingress/Egress Tunnel Router ("xTR") of the new site. Moves are detected by configuring xTRs to compare the source in the IP header of traffic received from a host against a range of previses that are allowed to roam. These prefixes are defined as dynamic EIDs. When deployed at the first hop router (xTR), LISP devices also provide adaptable and comprehensive first hop router functionality to service the IP gateway needs of roaming devices that relocate.

In general, LISP host mobility functionality allows any IP-addressable device, or "host," to move, or "roam," from its subnet to another subnet or to a different location, such as a remote data center, while maintaining its original IP address. In the context of LISP, a device that moves may be referred to as a "roaming device," and its IP address is its EID. An xTR configured for LISP host mobility is typically positioned at the aggregation layer of a data center to enable the xTR function to be collocated on the device that functions as the default gateway. As will be described in detail below, LISP xTR devices dynamically determine when a workload moves into or away from one of its directly connected subnets.

Referring first to FIG. 1, illustrated therein is a system 10 comprising features of one embodiment for providing host mobility in a LISP-enabled IP network 11. As shown in FIG. 1, the network 10 includes multiple LISP-enabled sites, represented in FIG. 1 by sites 12A, 12B, and 12C. In the illustrated embodiment, the site 12A is a remote LISP-enabled site and the sites 12B and 12C comprise data center sites. Each of the sites 12A-12C includes an xTR device, represented in FIG. 1 by xTRs 14A, 14B, and 14C, respectively. It will be noted that an xTR is a LISP site edge device that implements the functions of both an ITR and an ETR, thereby to enable establishment of bidirectional flows via the device. Each of the sites 12A-12C is connected to a server 16 via its respective xTR 14A-14C. The server 16 may comprise functionality for implementing both a Map-Server ("MS") 18 and a Map-Resolver ("MR") 20. The MS and MR (collectively MS/MR) are key components in a LISP deployment. They provide the ability to store and restore EID-to-RLOC mapping information for the LISP routers (xTRs) to route between LISP-enabled sites. The MS is a LISP infrastructure device with which the ETR functionality of each LISP-enabled site (implemented in the xTR of the site in the embodiment shown in FIG. 1) registers its EID prefix(s). The MS stores the registered EID prefixes in a mapping database with each EID prefix mapped to an associated RLOC. All LISP-enabled sites of the network 10 use the MS 18 to resolve EID-to-RLOC mappings. The MR is a LISP infrastructure device to which ITR functionality of each LISP-enabled site (implemented in the xTR of the site in the embodiment shown in FIG. 1) sends LISP map-request queries when resolving EID-to-RLOC mappings. Upon receipt of a map request query, the MR finds the appropriate EID-to-RLOC mapping by checking with the MS, which may be co-located or distributed. For purposes of illustration and example herein, it will be assumed that the MS and MR are collocated.

LISP functionality may consist of data plane and control plane functions. The steps required to establish communication between devices in LISP-enabled sites in accordance with embodiments described herein may include the following. First, a client, such as a client 24, in a remote LISP-enabled site, such as site 12A, queries through DNS the IP address of a destination server deployed at one of the LISP-enabled data center sites (sites 12B and 12C in FIG. 1). Next, traffic originating from the client is steered toward the local LISP-enabled device, which is usually the client's default gateway. The LISP-enabled device performs a lookup for the destination server in its routing table. Since the destination is an EID subnet, it is not present in the RLOC space, so the lookup fails, triggering the LISP control plane. The ITR functionality of the remote xTR (e.g., xTR 14A), receives valid mapping information from the mapping database and populates its local map cache. It should be noted that the destination EID subnet may be associated with RLOCs identifying the ETR functionality of multiple xTR devices at the data center LISP-enabled site. Also, each map cache entry may have associated therewith priority and weight values that are controlled by the destination site used to receive LISP encapsulated traffic designated to a local EID subnet. The weight allows tuning the amount of traffic received by the ETR functionality of each xTR in a load-balancing scenario. On the data plane, the ITR functionality of the xTR of the remote site performs LISP encapsulation of the IP traffic originated by the device and sends it to the transport infrastructure designed for one of the RLOCs of the ETR functionality of the data center xTRs. Assuming the priority and weight values are configured equally for the ETR functionality of each xTR device, the selection of the specific xTR RLOC may be performed on a per-flow basis based on hashing, for example.

Figure 2:
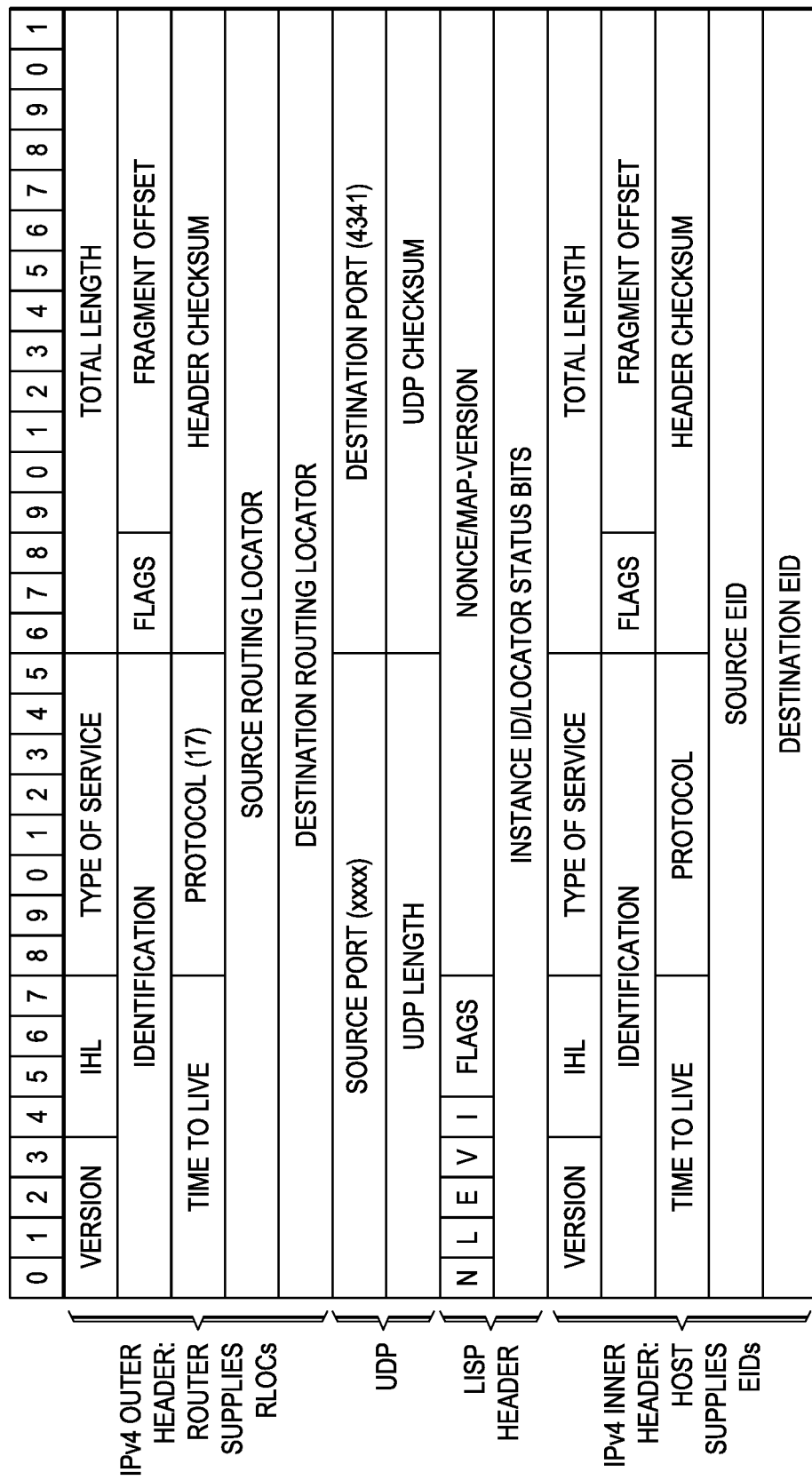
FIG. 2 illustrates an example format of a LISP encapsulated packet in accordance with embodiments shown and described herein.

FIG. 2 illustrates the format of a LISP encapsulated packet in accordance with one embodiment. As shown in FIG. 2, LISP leverages a User Datagram Protocol ("UDP") encapsulation where the source port value is dynamically created and associated with each original flow to ensure better load balancing of traffic across the transport infrastructure. Finally, the ETR functionality at the data center xTR receives the packet, decapsulates it, and forwards it into the site toward the destination EID. It should be noted that a similar mechanism would be used for return traffic originated by the data center EID and destined for the client.

The LISP control plane may operate as follows. First, the ETR functionality of each xTR registers with the MS the one or more EID subnets that are locally defined and over which it has authority. Map-registration messages are sent periodically every 60 seconds by each xTR via its ETR functionality. Assuming that a local map cache entry is not available, when a client at a remote site wants to establish communication with a DC EID, a map-request is sent by the ITR functionality of the remote site xTR to the MR, which then forwards the message to the MS. The MS forwards the original map-request to the ETR functionality of the xTR that last registered the EID subnet. The ETR functionality of the xTR then sends a map-reply containing the requested mapping information to the ITR functionality of the remote xTR. The ITR functionality then installs the mapping information in a local map cache maintained by the remote xTR and starts encapsulating traffic toward the data center EID destination.

Figure 3:
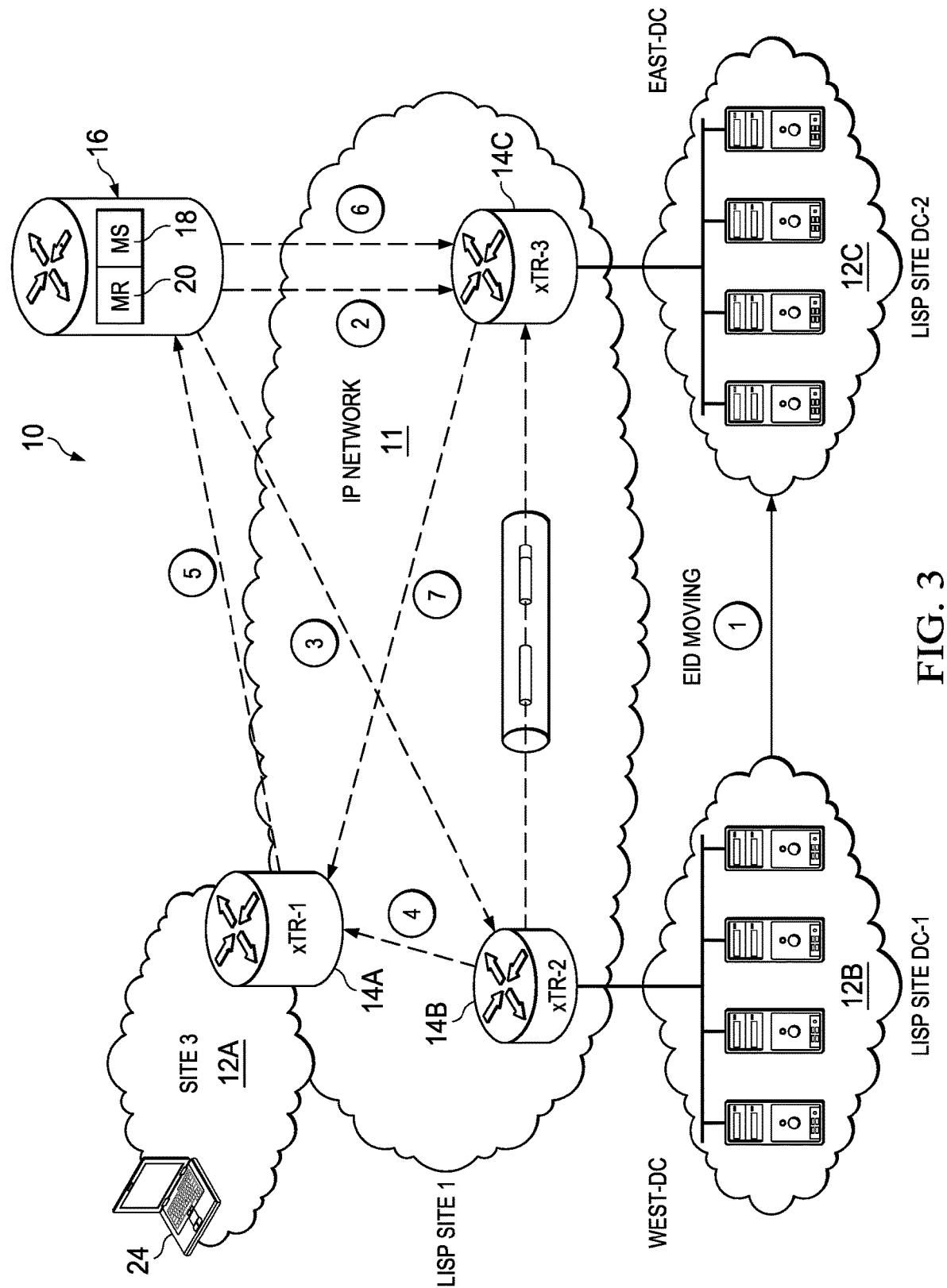
FIG. 3 is an annotated version of the simplified block diagram illustrated in FIG. 1.
Figure 4:
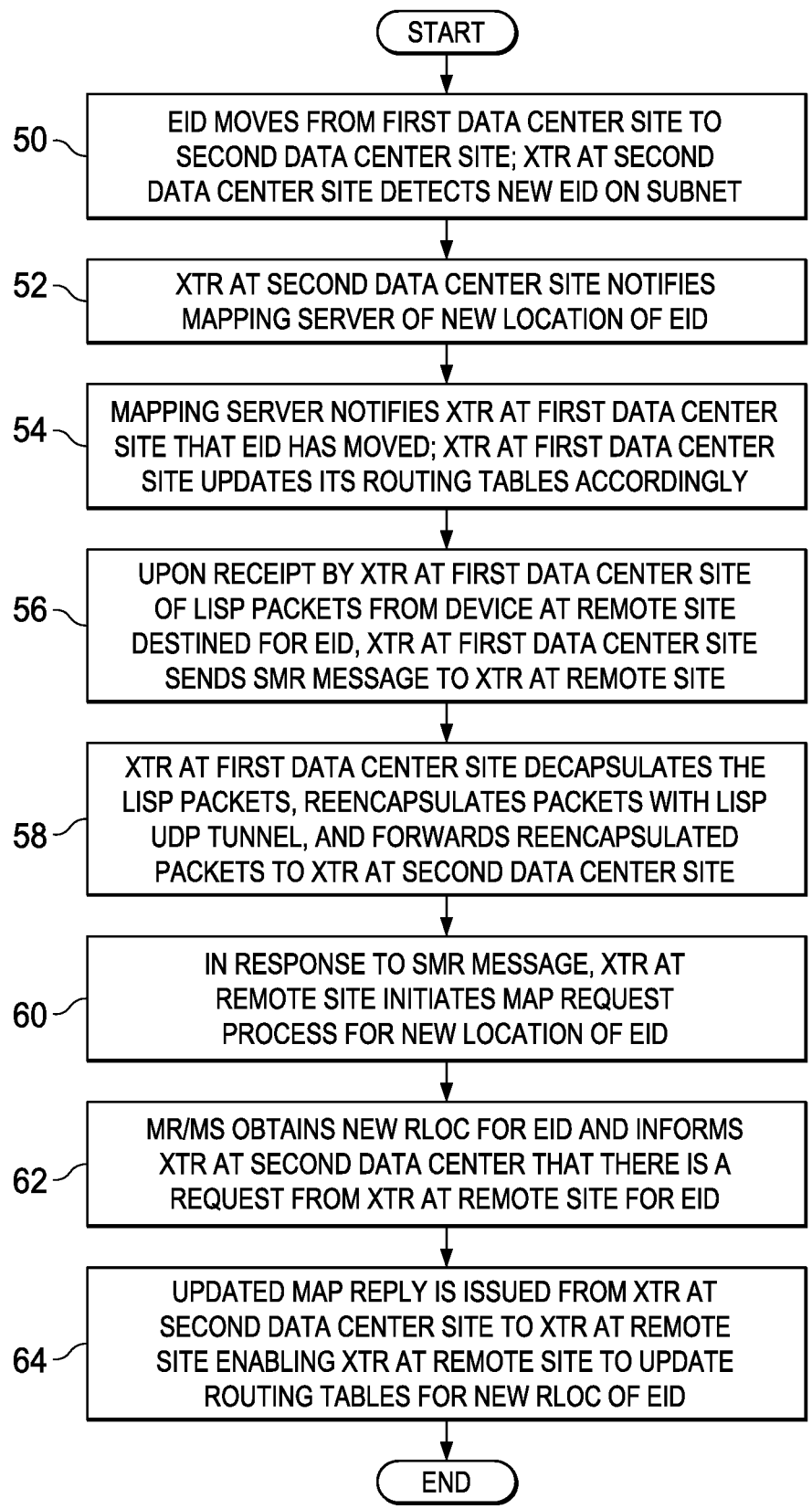
FIG. 4 is a flowchart illustrating an existing technique for implementing host mobility in a LISP-enabled IP network using the system depicted in FIG. 3.

FIG. 3 illustrates an annotated version of the system 10 of FIG. 1, which will be referenced in connection with a flowchart shown in FIG. 4 to describe an example LISP host mobility solution in accordance with previous embodiments. It will be assumed for the sake of illustration that a client 24 at remote site 12A has been communicating with a particular EID, at data center site 14B. In step 50 (represented by a line 1 in FIG. 3), when the EID moves from data center site 12B to data center site 12C, the xTR of site 12C (i.e., xTR 14C) will detect the presence of the new EID on its subnet. In step 52 (represented in FIG. 3 by a line 2), the new xTR (xTR 14C) notifies the MS 18 of the new location of the EID and updates the location of the new EID, indicating that the EID now belongs to a subnet of site 12C. In step 54 (represented in FIG. 3 by a line 3), the MS 18 communicates back to the xTR of the site from which the EID moved (i.e., xTR 14B) that the EID has moved and instructs the xTR to update its routing tables accordingly to reflect the move. It will be noted that at this point, the xTR of the remote site (xTR 14A) will continue to send LISP packets for the EID to the xTR serving the data center site that was the previous location of the EID, having not yet been advised of the EID move. In step 56 (represented in FIG. 3 by a line 4), upon receipt at the xTR of the first data center site (xTR 14B) of packets from the xTR of the remote site (xTR 14A) of packets destined for the EID, the xTR 14B sends an Solicit-Map-Request ("SMR") message to xTR 14A. In step 58, decapsulates the received packets, encapsulates them with a LISP UDP tunnel, and forwards them to xTR 14C, which will ultimately route them to the EID at its new location.

In step 60 (represented in FIG. 3 by a line 5), in response to the SMR message, xTR 14A initiates a map request process for the new RLOC for host EID. In step 62 (represented in FIG. 3 by a line 6), MR/MS checks the LISP database and obtains the new RLOC xTR 14C and then informs xTR 14C that there is a request from xTR 14A for the EID. In step 64 (represented in FIG. 3 by a line 7), an updated map-reply is issued from the new location (xTR 14C) to xTR 14A and the traffic between the host and EID is adjusted to new RLOC xTR 14A and xTR 14C, respectively.

As described above, if xTRs 14B and 14C never communicated with one another, xTR 14C would have no way of knowing the original xTR of the moved host (xTR 14B, in the illustrated example). This could cause trouble for those services, including Layer 3 ("L3") and Layer 4 ("L4") firewalls and a variety of Layer 7 ("L7") services, that can work on the original xTR but cannot work on the new xTR. For example, in the case of a firewall, the traffic session is recorded on the original xTR but the session information just gets lost on the new xTR. Additionally, in the case of Network Based Application Recognition ("NBAR"), NBAR can detect traffic type and apply NBAR action to traffic flow on the original xTR, but on the new xTR, the traffic characteristic has already been lost, such that NBAR cannot work on the new xTR.

In accordance with features of embodiments described herein, a technique is provided for a simple and stable mechanism to provide a source aware process for LISP host mobility in which the MS/MR notifies an xTR to which an EID has moved (the "destination xTR") of the identity of the xTR from which the EID has moved (the "source xTR"). As will be described in greater detail below with reference to FIGS. 9 and 10, in certain embodiments, a LISP control plane may establish a communication channel between the destination xTR and the source xTR in order to sync firewall sessions from the source to the destination.

Figure 5:
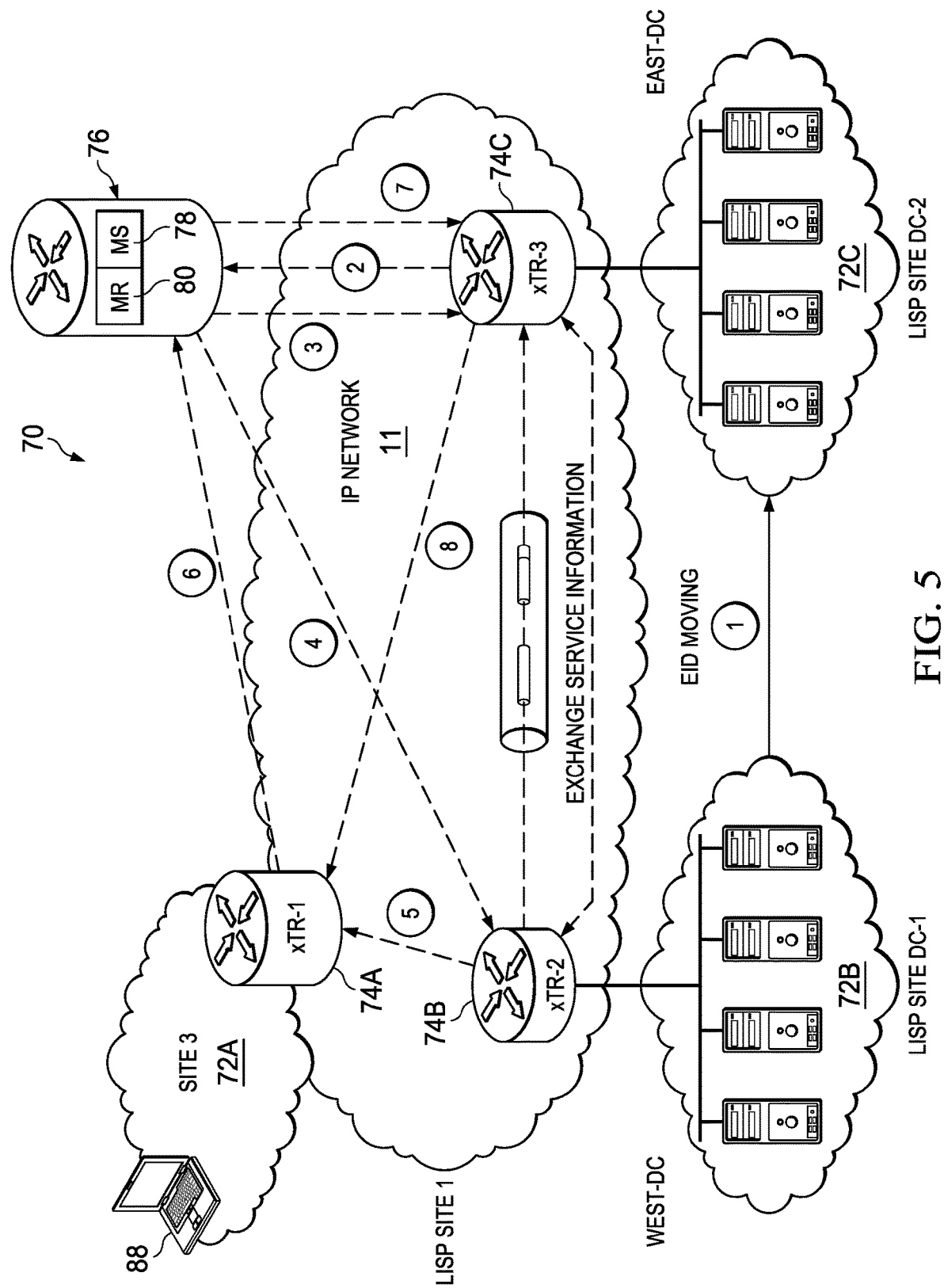
FIG. 5 is a simplified block diagram comprising features of one embodiment for providing source aware host mobility in a LISP-enabled IP network.

FIG. 5 illustrates a system 70 comprising features of one embodiment for providing source-aware host mobility in a LISP-enabled IP network 71. Similar to FIG. 1, the network 70 includes multiple LISP-enabled sites, represented in FIG. 5 by sites 72A, 72B, and 72C. In the illustrated embodiment, the site 72A is a remote LISP-enabled site and the sites 72B and 72C comprise data center sites. Each of the sites 72A-72C includes an xTR device, represented in FIG. 5 by xTRs 74A, 74B, and 74C, respectively. It will be noted that an xTR is a LISP site edge device that implements the functions of both an ITR and an ETR, thereby to enable establishment of bidirectional flows via the device. Each of the sites 72A-72C is connected to a server 76 via its respective xTR 74A-74C. The server 76 may comprise functionality for implementing both a Map-Server ("MS") 78 and a Map-Resolver ("MR") 80. As with FIGS. 1 and 3, for purposes of illustration and example herein, it will be assumed that the MS 78 and MR 80 are collocated.

Figure 6:
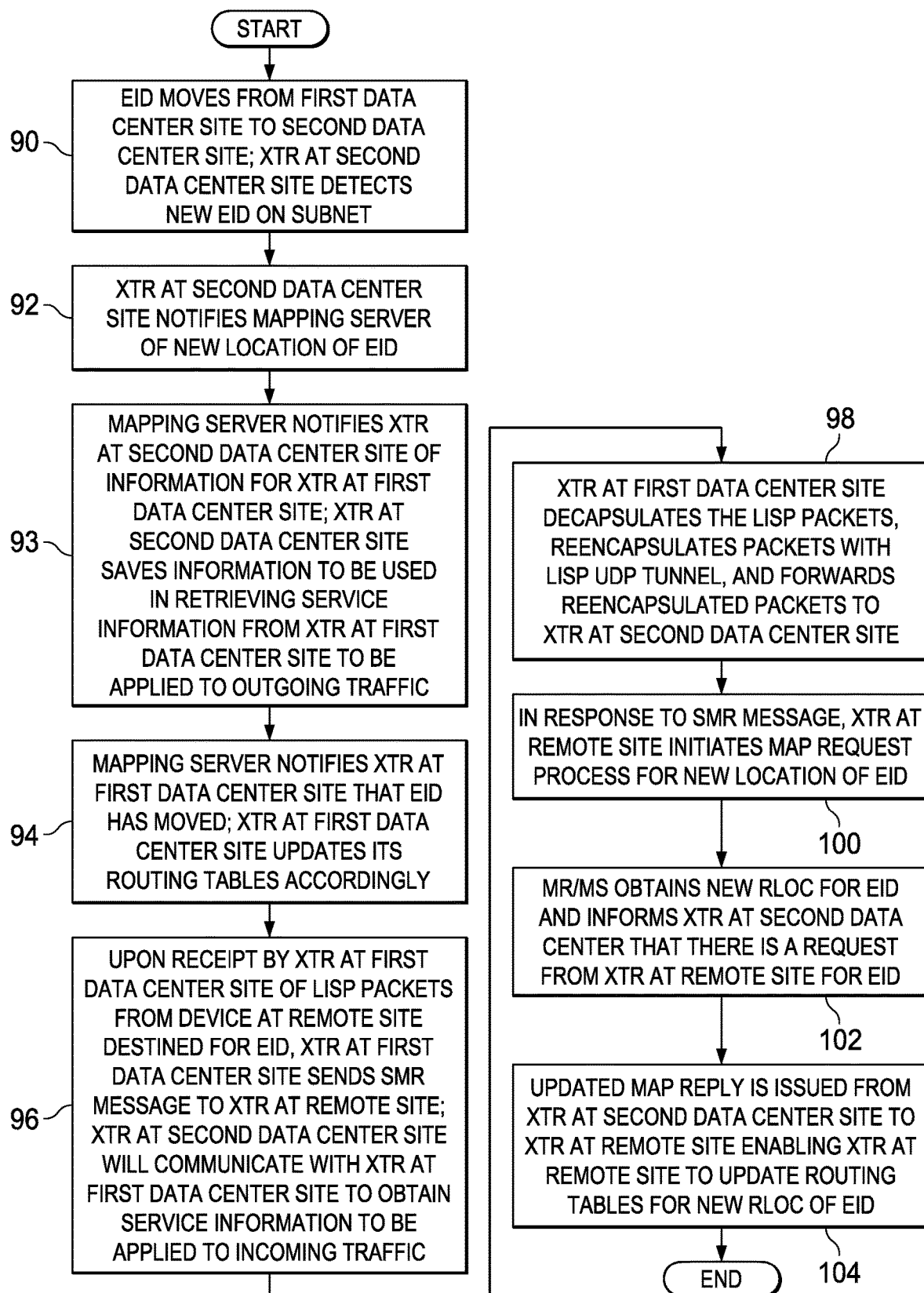
FIG. 6 is a flowchart illustrating a technique for implementing source aware host mobility in a LISP-enabled IP network using the system depicted in FIG. 5.

FIG. 6 is a flowchart illustrating operation of FIG. 5 in connection with embodiments described herein for implementing a source aware LISP mobility solution. It will be assumed for the sake of illustration that a client 88 at remote site 72A has been communicating with a particular EID, at data center site 74B. In step 90 (represented by a line 1 in FIG. 5), when the EID moves from data center site 72B to data center site 72C, the xTR of site 72C (i.e., xTR 74C) will detect the presence of the new EID on its subnet. In step 92 (represented in FIG. 5 by a line 2), the new xTR (xTR 74C) notifies the MS 78 of the new location of the EID and updates the location of the new EID, indicating that the EID now belongs to a subnet of site 72C. In step 93 (represented in FIG. 5 by a line 3), the mapping server notifies the xTR of the data center site to which the EID has moved (xTR 74C) of information identifying the xTR of the data center site at which the EID was previously located (xTR 74B). The destination xTR (XTR 74C) saves this information to be used in communicating with the source xTR (xTR 74B) to retrieve service information to be applied to outgoing traffic. This information has been heretofore not consistently available to the destination xTR. In step 94 (represented in FIG. 5 by a line 4), the MS 78 communicates back to the xTR of the site from which the EID moved (i.e., xTR 74B) that the EID has moved and instructs the xTR to update its routing tables accordingly to reflect the move. It will be noted that at this point, the xTR of the remote site (xTR 74A) will continue to send LISP packets for the EID to the xTR serving the data center site that was the previous location of the EID, having not yet been advised of the EID move. In step 96 (represented in FIG. 5 by a line 5), upon receipt at the xTR of the first data center site (xTR 74B) of packets from the xTR of the remote site (xTR 74A) of packets destined for the EID, the xTR 74B sends an Solicit-Map-Request ("SMR") message to xTR 74A. Additionally, the destination xTR (xTR 74C) communicates with the source xTR (xTR 74B) to obtain service information to be applied to the incoming traffic.

Figure 9:
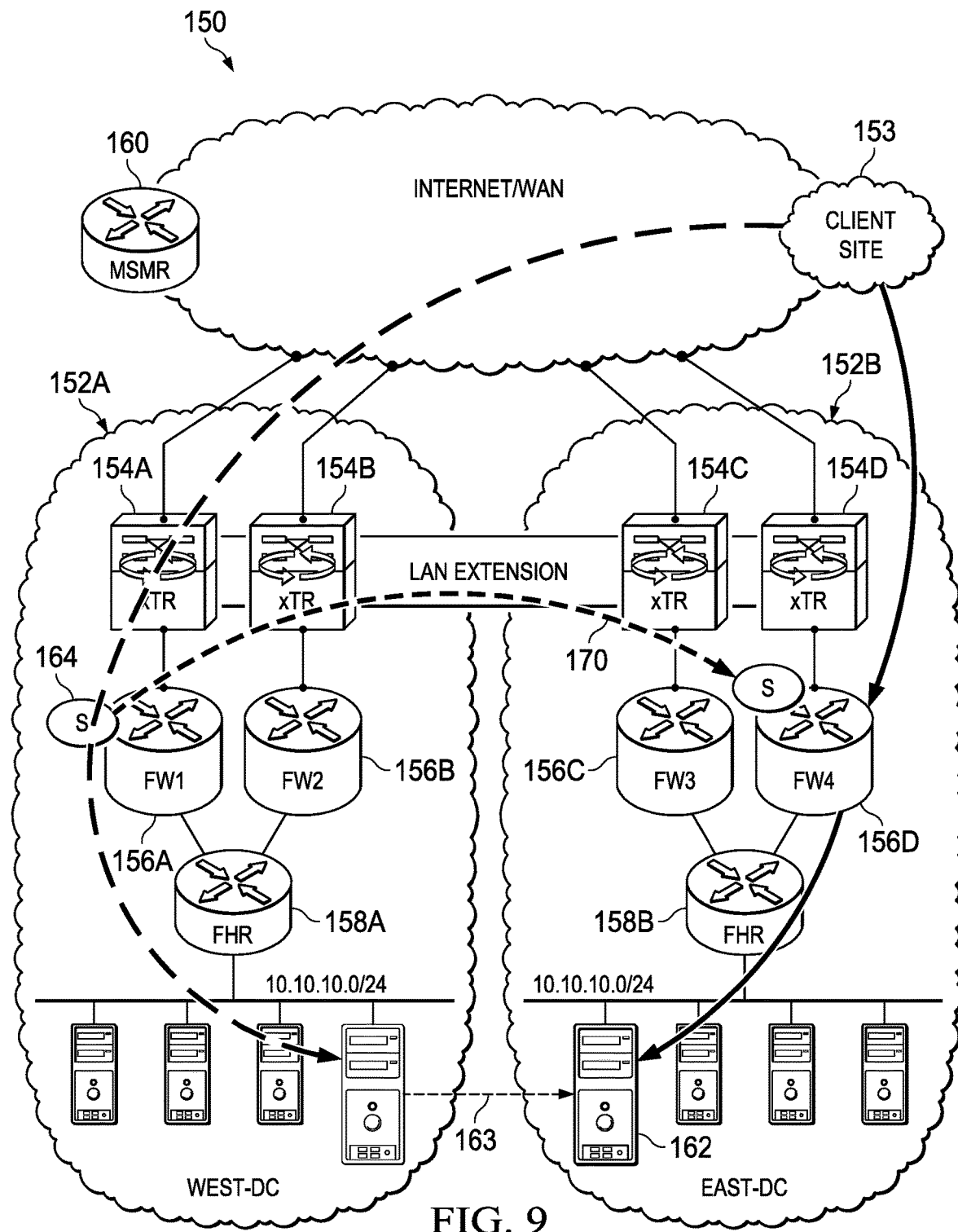
FIG. 9 is a simplified block diagram comprising features of an embodiment for providing firewall mobility support in a LISP-enabled network.

In certain embodiments, as described in greater detail below with reference to FIGS. 9 and 10, a firewall can perform either an event-driven sync, which involves syncing of one firewall state at a time, or a bulk sync. In step 98, the source xTR decapsulates the received packets, encapsulates them with a LISP UDP tunnel, and forwards them to the destination xTR (xTR 74C), which will ultimately route them to the EID at its new location. At this point, however, for traffic going into the destination xTR, services can communicate with the source xTR to immediately obtain service info and apply the service action to the incoming traffic.

In step 100 (represented in FIG. 5 by a line 6), in response to the SMR message, xTR 74A initiates a map request process for the new RLOC for host EID. In step 102 (represented in FIG. 5 by a line 7), MR/MS checks the LISP database and obtains the new RLOC xTR 74C and then informs xTR 74C that there is a request from xTR 74A for the EID. In step 104 (represented in FIG. 5 by a line 9), an updated map-reply is issued from the new location (xTR 74C) to xTR 74A and the traffic between the host and EID is adjusted to new RLOC xTR 74A and xTR 74C, respectively.

The embodiments described herein comprise mechanisms for implementing a source aware technique for LISP mobility. It should be noted that, although FIG. 6 illustrates a process in which the MS/MR operates as a proxy for the new xTR, it would be possible to revise steps 102 and 104 such that the MS/MR would provide the EID directly to the requesting xTR (in this case, the remote xTR) on request without forwarding the request to the new xTR.

As previously noted, prior to embodiments described herein, when LISP was interworking with a service such as NBAR, the NBAR service would likely have been lost upon movement of an EID from one xTR/LISP-enabled site to another. This is at least partly due to the fact that the previous and current xTRs are typically not High Availability ("HA") peers, so NBAR flow information was not previously synced between the xTRs. Additionally, in a LISP solution, there are likely numerous xTRs to which the host may be moved and it is not workable to put all of the xTR boxes into a single HA group. Therefore, in accordance with features of another embodiment, which may be implemented in concert with or as an alternative to the embodiments shown and described with reference to FIGS. 5 and 6, order to provide continuous NBAR service when LISP mobility occurs, an NBAR controller may be introduced into the LISP deployment.

Figure 7:
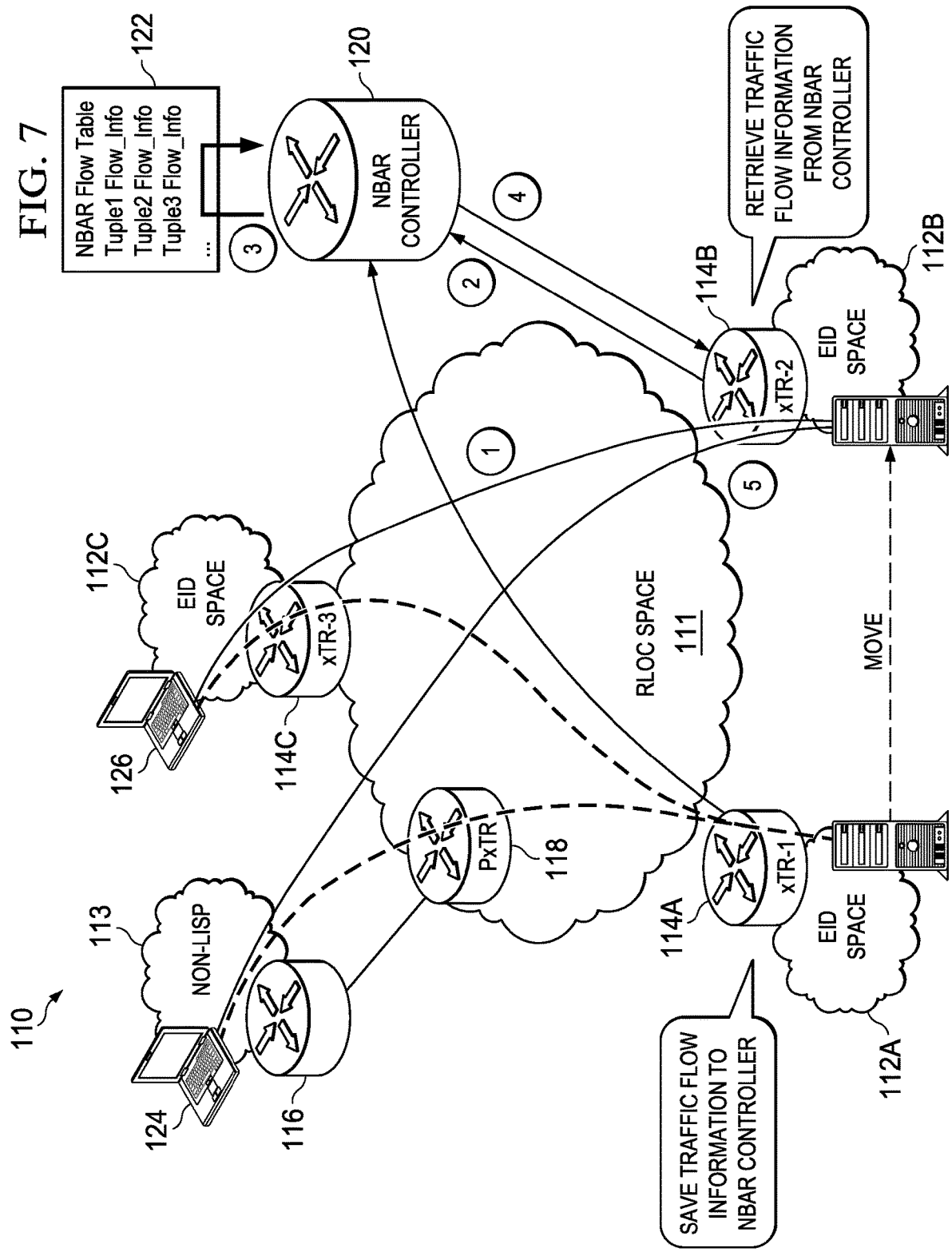
FIG. 7 is a simplified block diagram comprising features of an embodiment for providing continuous Network Based Application Recognition ("NBAR"), service during LISP mobility in a LISP-enabled IP network.

In accordance with features of another embodiment described herein, a technique is provided for providing continuous NBAR service during LISP mobility. FIG. 7 illustrates a system 110 comprising features of one embodiment for providing continuous NBAR service during LISP mobility in a LISP-enabled IP network 111. The network 110 includes multiple LISP-enabled sites, represented in FIG. 7 by sites 112A, 112B, and 112C, as well as a non-LISP site 113. Each of the sites 112A-112C includes an xTR device, represented in FIG. 7 by xTRs 114A, 114B, and 114C, respectively. As previously noted, an xTR is a LISP site edge device that implements the functions of both an ITR and an ETR, thereby to enable establishment of bidirectional flows via the device. The non-LISP site 113 is connected via a router 116 to a proxy xTR 118, which functions to connect LISP sites, such as sites 112A-112C, to non-LISP sites, such as site 113. In accordance with features of embodiments described herein, an NBAR controller 120 is provided and maintains an NBAR flow table 122 for purposes that will be described hereinbelow. In general, NBAR controller is a central place (logical or physical) that maintains NBAR traffic flow information in the NBAR flow table 122 and tuple (e.g., five-tuple or seven-tuple) indexes the traffic flow information. The traffic flow information is used to save the NBAR service, or action, to be applied to the traffic flow.

Figure 8:
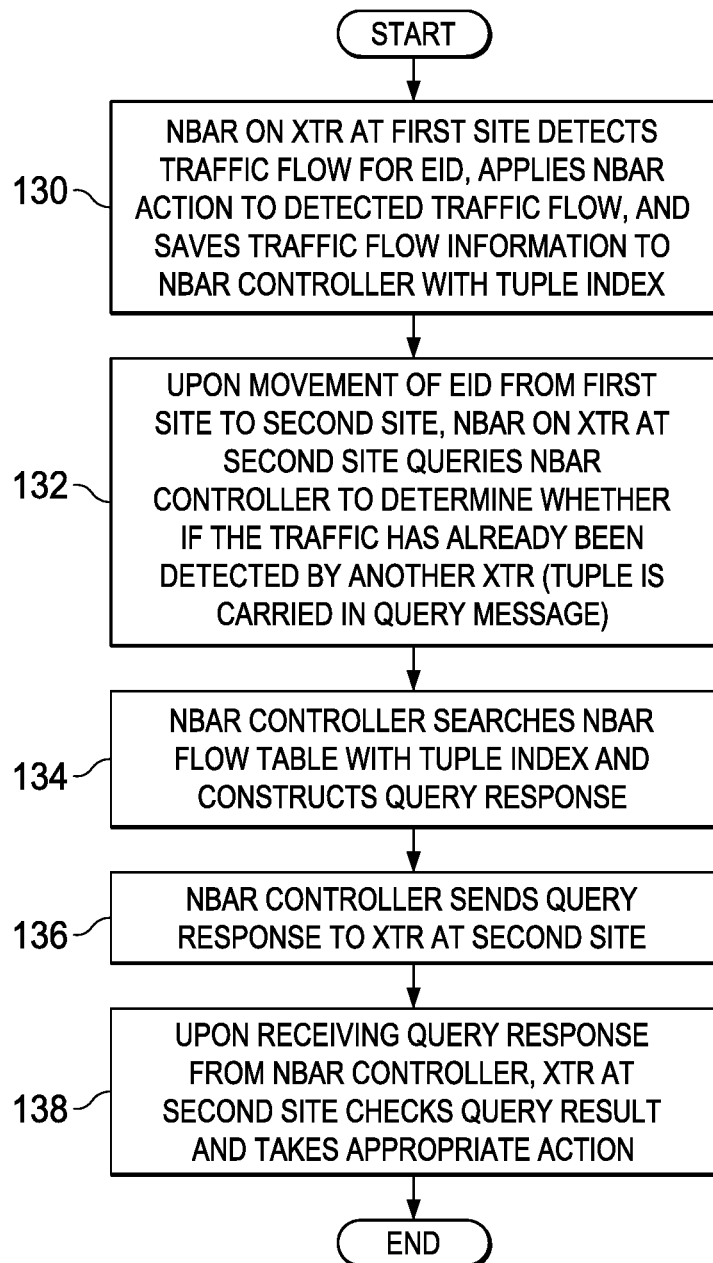
FIG. 8 is a flowchart illustrating a technique for providing continuous NBAR service during LISP mobility in a LISP-enabled IP network using the system depicted in FIG. 7.

FIG. 8 is a flowchart illustrating operation of the embodiment shown in FIG. 7 for providing continuous NBAR service during LISP mobility. It will be assumed for the sake of illustration that a client 124 at non-LISP site 113 and a client 126 at LISP-enabled site 112C have each been communicating with a particular EID originally located at site 112A. In step 130, (represented by a line 1 in FIG. 7), an NBAR service on the xTR at site 112A (i.e., xTR 114A) detects the traffic flow for each device, applies the NBAR action to each flow, and saves the flows to the NBAR controller 120, which tuple indexes the flows in the flow table 122. In step 132 (represented in FIG. 7 by a line 2), upon detection of movement of the EID from the source xTR (e.g., xTR 112A) to a destination xTR (e.g., xTR 112B), the NBAR service will first query the NBAR controller to determine whether the traffic has already been detected by another xTR. The tuple is carried in the query message. In step 134 (represented in FIG. 7 by a line 3), upon receiving the query message, the NBAR controller 120 searches the NBAR flow table 122 using the tuple index and constructs a query response. In step 136 (represented in FIG. 7 by a line 4), the NBAR controller 120 sends the query response to xTR 114B. In step 138 (represented in FIG. 7 by a line 5), upon receipt of the query response from the NBAR controller 120, xTR 114B checks the query result and takes the appropriate action. For example, if the traffic flow has already been detected (i.e., there is a record in the NBAR flow table 122), the NBAR service just applies the indicated NBAR action to the traffic flow. If the traffic flow has not been detected, NBAR just continues with the current behavior.

In this manner, NBAR can still apply quality of service ("QoS") on the traffic flow after an EID moves from one xTR/LISP-enabled site to another. Additionally, traffic detection efforts can be saved, since the traffic flow has already been detected. Finally, existing NBAR QoS policy is provisioned on each xTR separately. Sometimes, the configuration may be wrong on a certain xTR and then the xTR will take the wrong QoS action. The presence of an NBAR controller enables QoS policy to be distributed to all xTRs to make sure that all xTRs have the same NBAR QoS policy.

As previously noted, in certain embodiments, to ensure that firewall services are continued after movement of an EID from a source site to a destination site, firewall state information must be moved with the EID. FIG. 9 illustrates a system 150 comprising features of one embodiment for providing firewall mobility support in a LISP-enabled network. The system 150 includes multiple LISP-enabled data center sites, represented in FIG. 9 by sites 152A and 152B, as well as a client site 153. Each of the sites 152A, 152B, includes a pair of xTR devices 154A-154D. Each of the sites 152A, 152B, also includes a pair of firewalls 156A-156D, each of which is connected to a corresponding one of the xTRS 152A-152D. The pair of firewalls 156A-156B is connected to a first hop router ("FHR") 158A. Similarly, the pair of firewalls 156C-156D is connected to a FHR 158B. An MS/MR 160, the functionality of which has been described in detail above, is also provided. It will be assumed for the sake of example that an EID 162 is moved from site 152A to site 152B (as represented by a dotted line 163) in the middle of a stateful conversation with a device at client site 153. It will be further assumed that at that point, state 164 is maintained by firewall 156A. After the move, FHR 158B discovers the presence of the EID on its subnet and signals local xTRs 152C-152D, which register EID presence with MS/MR 160. XTRs 152A, 152B, and FHR 158A are notified of the EID move by FHR 158B and MS/MR 160, as described above. XTRs 152A, 152B, send an SMR to the device at the client site 152, which updates its cache, and traffic to EID 162 is now routed to xTRs 152C and 152D. At this point, however, state still remains at firewall 156A; if left unattended, when incoming EID traffic reaches firewall 156D destined for FHR 158B, as there is no state associated with the conversation at firewall 156D, traffic would be dropped and a new session would need to be established.

In accordance with features of one embodiment, the firewall state is moved from the source firewall (e.g., firewall 156A) to the destination firewall (e.g., firewall 156D) to prevent traffic from being dropped upon arrival at the destination firewall. In one embodiment, a state sync is triggered by the MS/MR 160 or LISP control plane, which notifies the firewall 156D where the state for the traffic is located (in this case, firewall 156A). Firewall 156D then obtains the state 164 from firewall 156A (as represented by a dotted line 170) (in a manner such as described in greater detail below) via a communication channel established by MS/MR 160 or the LISP control plane to pass state sync messages between the firewall pairs.

State may be obtained from the source firewall by the destination firewall using one of several approaches. One such approach is referred to herein as a signal-based event-driven bulk state transfer ("EDBST") approach. In the signal-based EDBST, firewalls are auto-provisioned with a dynamic server subnet. Firewalls with state information are notified that an EID has moved to a specific firewall group; consequently, the source and destination firewalls initiate a bulk state transfer. This method is granular and scalable and provides state duplication before the server traffic is steered. Another approach is referred to herein as a traffic-based EDST approach. In the traffic-based EDST approach, firewall peering pairs in the source and destination sites are notified by the MS/MR when an EID move is detected. Each time traffic to the dynamic server subnet hits a firewall and there is no associated state, a state-sync request is sent to the peering pairs, which send their state information. In this approach, a dynamic server subnet may not be required due to the fact that a filter is not required, since state is synced per request. Both the signal-based EDBST approach and the traffic-based EDST approach rely on notification from the MS/MR or LISP control plane to link the source firewall with the destination firewall, as described above.

Figure 10:
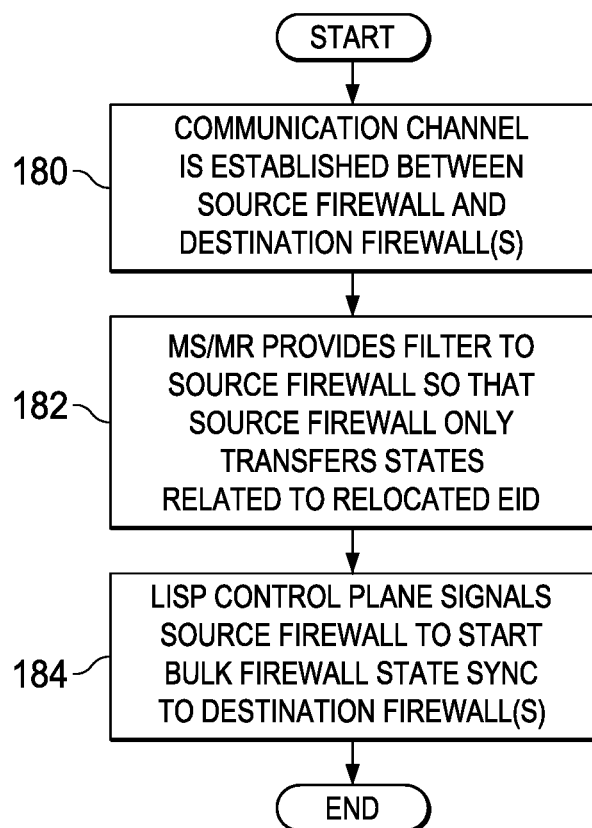
FIG. 10 is a flowchart illustrating a technique for implementing an event driven bulk state transfer for providing firewall mobility support in the system illustrated in FIG. 9.

FIG. 10 is a flowchart illustrating an EDBST approach to moving firewall state. In step 180, the MS/MR or LISP control plane establishes a communication channel between the source firewall and the destination firewall(s) to pass state sync messages after the MS/MR or LISP control plane detects the move. In step 182, the MS/MR provides a filter to the source firewall so that only states that are related to the relocated EID will be transferred. In step 184, the LISP control plane signals the source firewall to begin a bulk firewall state sync to the destination firewall(s) by sending a state-sync request to the source firewall.

In one example implementation, various devices involved in implementing the embodiments described herein can include software for achieving the described functions. For example, each of the xTRs, MS/MR server, and NBAR controller illustrated in the FIGURES may be implemented using one or more computer devices comprising software embodied in one or more tangible media for facilitating the activities described herein. The computer device for implementing each of the xTRs, MS/MR server, and NBAR controller may also include a memory device (or memory element) for storing information to be used in achieving the functions as outlined herein. Additionally, the computer device for implementing the each of the xTRs, MS/MR server, and NBAR controller may include a processor that is capable of executing software or an algorithm to perform the functions as discussed in this Specification, including but not limited to the functions illustrated in and described with reference to the FIGURES. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and shown in the FIGURES may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to the FIGUREs. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method comprising:
   detecting, by a first network device of a first Location Identity Separation Protocol ("LISP")-enabled site, a local connection of an endpoint identifier ("EID") corresponding to a virtual machine ("VM") that relocated from a second LISP-enabled site to the first LISP-enabled site;
   notifying, by the first network device, a new location of the EID in the first LISP-enabled site to a mapping server;
   receiving, by the first network device, identifying information of a second network device of the second LISP-enabled site previously connected to the EID; and
   retrieving, by the first network device from the second network device based on the identifying information, service information for traffic associated with the EID.

2. The method of claim 1, wherein the first network device or the second network device is a LISP site edge device.

3. The method of claim 1, wherein the first network device or the second network device comprises an ingress/egress tunnel router ("xTR").

4. The method of claim 1, wherein a service identified by the service information comprises a firewall, the method further comprising:
   establishing a communications channel between a firewall at the first LISP-enabled site and a firewall at the second LISP-enabled site.

5. The method of claim 1, wherein the first network element detects the EID at least by comparing a source in a packet header from the EID within a range of prefixes enabled to roam.

6. The method of claim 1, further comprising:
   in response to the relocation of the EID, initiating a state transfer related to the EID, wherein the state transfer utilizes a filter to prevent transfer of state information unrelated to the EID.

7. The method of claim 6, wherein the state transfer is one of a signal-based event-driven bulk state transfer ("EDBST") and a traffic-based event-driven state transfer ("EDST").

8. The method of claim 1, wherein a service identified by the service information comprises Network Based Application Recognition ("NBAR"), the method further comprising:
   subsequent to the detecting, sending a query to an NBAR controller to determine an action to be performed in connection with the traffic associated with the EID, wherein the query includes a tuple identifying the traffic associated with the EID, the tuple being used to index an entry of a flow table maintained by the NBAR controller, the indexed flow table entry indicating the action to be performed;
   receiving from the NBAR a query response comprising an indication of the action to be performed in connection with the traffic associated with the EID; and
   applying the indicated action.

9. A system comprising:
   at least one processor; and
   at least one memory storing instructions, which when executed by the at least one processor, causes the at least one processor to:
      detect, at a first Location Identity Separation Protocol ("LISP")-enabled site, a local connection of an endpoint identifier ("EID") corresponding to a virtual machine ("VM") that relocated from a second LISP-enabled site to the first LISP-enabled site;
      notify a new location of the EID in the first LISP-enabled site to a mapping server;
      receive identifying information of a network device of the second LISP-enabled site previously connected to the EID; and
      retrieve, from the network device, based on the identifying information, service information for traffic associated with the EID.

10. The system of claim 9, wherein the system or the network device is a LISP site edge device.

11. The system of claim 9, wherein the system or the network device comprises an ingress/egress tunnel router ("xTR").

12. The system of claim 9, wherein a service identified by the service information comprises a firewall, the method further comprising:
   establishing a communications channel between a firewall at the first LISP-enabled site and a firewall at the second LISP-enabled site.

13. The system of claim 9, wherein the first network element detects the EID at least by comparing a source in a packet header from the EID within a range of prefixes enabled to roam.

14. The system of claim 9, further comprising instructions, which when executed by the at least one processor, causes the at least one processor to:
   in response to the relocation of the EID, initiate a state transfer related to the EID, wherein the state transfer utilizes a filter to prevent transfer of state information unrelated to the EID.

15. The system of claim 14, wherein the state transfer is one of a signal-based event-driven bulk state transfer ("EDBST") and a traffic-based event-driven state transfer ("EDST").

16. The system of claim 9, wherein a service identified by the service information comprises Network Based Application Recognition ("NBAR"), and further comprising instructions, which when executed by the at least one processor, causes the at least one processor to:
   subsequent to the detection, send a query to an NBAR controller to determine an action to be performed in connection with the traffic associated with the EID, wherein the query includes a tuple identifying the traffic associated with the EID, the tuple being used to index an entry of a flow table maintained by the NBAR controller, the indexed flow table entry indicating the action to be performed;
   receive from the NBAR a query response comprising an indication of the action to be performed in connection with the traffic associated with the EID; and
   apply the indicated action.

17. At least one non-transitory computer-readable medium storing instructions, which when executed by at least one processor, causes the at least one processor to:
   detect, at a first Location Identity Separation Protocol ("LISP")-enabled site, a local connection of an endpoint identifier ("EID") corresponding to a virtual machine ("VM") that relocated from a second LISP-enabled site to the first LISP-enabled site;

notify a new location of the EID in the first LISP-enabled site to a mapping server;

receive identifying information of a network device of the second LISP-enabled site previously connected to the EID; and retrieve, from the network device, based on the identifying information, service information for traffic associated with the EID.

18. The at least one non-transitory computer-readable medium of claim 17, wherein the first network element detects the EID at least by comparing a source in a packet header from the EID within a range of prefixes enabled to roam.

19. The at least one non-transitory computer-readable medium of claim 17, further comprising instructions, which when executed by the at least one processor, causes the at least one processor to:

in response to the relocation of the EID, initiate a state transfer related to the EID, wherein the state transfer utilizes a filter to prevent transfer of state information unrelated to the EID.

20. The at least one non-transitory computer-readable medium of claim 17, wherein the state transfer is one of a signal-based event-driven bulk state transfer ("EDBST") and a traffic-based event-driven state transfer ("EDST").

* * * * *